(12) United States Patent
Spruill (10) Patent No.: US 6,216,921 B1
(45) Date of Patent: Apr. 17, 2001

(54) FUNNEL CAKE BATTER AND OTHER BATTER DISPENSER

(76) Inventor: Paul Rayford Spruill, 1629 E. Cherokee Ave., Enid, OK (US) 73701

( * ) Notice: Subject to any disclaimer, the term of this patent is extended or adjusted under 35 U.S.C. 154(b) by 0 days.

(21) Appl. No.: 09/337,237

(22) Filed: Jun. 22, 1999

Related U.S. Application Data (60) Provisional application No. 60/090,533, filed on Jun. 24, 1998.

(51) Int. Cl.[7] ...................................................... B67D 3/00
(52) U.S. Cl. .......................................... 222/399; 222/529
(58) Field of Search ..................................... 222/529, 399

(56) References Cited

U.S. PATENT DOCUMENTS

| | | |
|---|---|---|
| 2,825,494 | 3/1958 | Belshaw . |
| 3,286,884 * | 11/1966 | Long, Jr. ................................ 222/399 |
| 5,529,220 * | 6/1996 | Creidle, Jr. et al. ................... 222/399 |
| 5,645,195 | 7/1997 | Belshaw et al. . |
| 5,772,075 * | 6/1998 | Ash, Jr. et al. ........................ 222/399 |

* cited by examiner

*Primary Examiner*—Philippe Derakshani (57) ABSTRACT

In accordance with the present invention, an apparatus is provided for dispensing funnel cake batter or other batter more productively and more sanitarily in a labor-saving and timesaving manner. This apparatus is an assembly made-up of three subassemblies, namely subassembly A, subassembly B, and subassembly C.

4 Claims, 6 Drawing Sheets

FUNNEL CAKE BATTER AND OTHER BATTER DISPENSER

CROSS-REFERENCE TO RELATED APPLICATIONS

This application is entitled to the benefit of Provisional Patent Application Ser. No. 60/090,533, filed Jun. 24, 1998.

BACKGROUND

1. Field of Invention

This invention generally relates to batter dispensers, and more specifically, to an apparatus capable of dispensing funnel cake batter and other batter in a more productive and sanitary manner with less labor, less waste, and less time-consumption involved.

2. Description of Prior Art

Originally, funnel cake batter was dispensed into the frying oil for cooking by holding a small funnel in your hand, with the thumb closing off the small hole, filled with batter. As the thumb was released from covering the small hole batter was dispensed into the frying oil. This method of dispensing funnel cake batter suffers the following number of vantages:

(a) It is unsanitary. Although, many people who cook funnel cakes, primarily operators of concession trailers at amusement parks, fairs, arts and craft shows, and civic functions, still use this primitive method of dispensing funnel cake batter into the flyer. It is unsanitary because the cook holding the funnel has to dip that hand, uncovered without a glove because when dispensing the batter into the fryer the heat of the frying oil which is at a temperature of 375 degrees Fahrenheit tends to cause plastic sanitary gloves to become unusable, into a large batter container to fill the funnel. And, the glove worn by the cook, after having had to dip the funnel into the large batter container to refill the funnel to serve more than one customer, becomes caked with batter and unusable. Also, since most concession trailers are operated by one or two persons, the cook usually has to make change handling the customer's money with the same hand that he pours the funnel cake batter with having no time or opportunity to wash his hands.

(b) It is laborious. This method of holding a funnel in his hand to dispense funnel cake batter is very tiresome in that if the cook has to serve a large volume of funnel cakes to a crowd of people at the various types of events previously mentioned the act of holding the funnel, with the thumb over the small hole as the control valve, over the fryer to dispense the batter is very exhausting And, the act of constantly dipping the funnel into the large batter container to refill the funnel is very laborious.

(c) It is very time consuming. This method of holding a funnel in his hand to dispense funnel cake batter is very time consuming in that the cook has to refill the funnel every single time funnel cake batter is poured into the flyer to make one funnel cake.

The second method for dispensing funnel cake batter is from a pitcher, made of stainless steel with a funnel like spout design and it is a little less primitive than holding a funnel by hand. But, it too suffers a number of disadvantages:

(a) It is very tiresome and very time-consuming. The funnel cake batter pitcher has to be refilled often and the weight of the pitcher, after having poured several funnel cakes, becomes very heavy.

(b) The spout des of the funnel cake pitcher, in normal operation, becomes clogged by being caked inside with batter and has to be cleaned often so that the batter can be dispensed with an even flow making a desirable funnel cake.

(c) The funnel cake pitcher is structurally weak where the spout is welded to the funnel portion of the pitcher. After, several uses the spout tends to break off due to the weight of the funnel cake batter and repeated use. Often, the spout has to be welded back on to the funnel cake pitcher after a few months of use which is an added expense to the concession operator.

(d) If the funnel cake pitcher is accidental dropped the spout can easily break off or become dented rendering the funnel cake pitcher less than operable.

Dough and batter dispensers used to dispense dough and batter are known in the prior art. As described in U.S. Pat. No. 2,825,494 a dough and batter dispenser is disclosed. It suffers the following disadvantages:

(a) It dispenses only a single charge of batter and then has to be refilled before batter can be dispensed again. In a commercial environment where large volume of food is produced this time-consuming act of refilling means less productively and less profit.

(b) This dipenser due to its design is known to have batter leakage problems after constant and repetitive use. Tis leakage can amount to a direct loss in productivity and profits. And, such leakage can result in an us food preparation environment.

A U.S. Pat. No. 5,645,195 to Belshaw, et.al., (1997) discloses an invention of a dough and batter dispenser. This dough and batter dispenser is used primarily for the dispensing of pancake batter. It can be used for dispensing other batters such as waffle batter, hush puppy batter, and other batters. It suffers the following disadvantages:

(a) When the hopper is full of batter, approximately 5.5 lbs., added to its own weight of 2 lbs. it is heavy to continuously hold over the griddle to dispense batter. Primary, used in commercial operations such as pancake restaurants due to the volume of pancakes cooked. The cook becomes very tired holding this dispenser to pour large quantities of batter in a normal eight hour work shift.

(b) Requires a manual pressing of a knob to dispense batter. This constant and repetitive pressing of the knob by the thumb of the user, in a downward stroking manner of the reciprocating of the dispensing rod, leads to fatigue. Especially, when used in a commercial environment where large volume of food is produced.

(c) The hopper containing the batter is not covered and sealed off from the environment. Therefore, pests or airborne contaminates can easily fall into the dispenser rendering the batter unsuitable for consumption.

(d) Requires a separate special stand to hold the dispenser upright when not in use. If not placed in a stand the batter will spill out of the hopper causing a loss in productivity and profit. And, not to mention an unsanitary food preparation environment that can be caused by spills.

Accordingly, there is a need in the commercial food industry, wherein the dispensing device will dispense funnel cake batter or other batter more productively and more sanitarily in a labor-saving and timesaving manner.

SUMMARY

In accordance with the present invention, an apparatus is provided for dispensing funnel cake batter or other batter more productively and more sanitarily in a labor-saving and timesaving manner. This apparatus comprises an assembly made-up of three subassemblies, namely subassembly A, subassembly B, and subassembly C.

Objects and Advantages

Accordingly, several objects and advantages of the present invention are:

(a) to provide an apparatus for dispensing funnel cake batter or other batter in a more productive manner;

(b) to provide an apparatus for dispensing funnel cake batter or other batter in a more sanitary manner;

(c) to provide an apparatus for dispensing funnel cake batter or other batter in a labor-saving manner;

(d) to provide an apparatus for dispensing funnel cake batter or other batter in a timesaving manner;

(e) to provide an apparatus for dispensing funnel cake batter or other batter which allows the batter to be free from pests or other airborne contaminates;

(f) to provide an apparatus for dispensing funnel cake batter or other batter which allows for an even flow of batter to the fryer or griddle;

(g) to provide an apparatus for dispensing funnel cake batter or other batter which allows the commercial food industry the capability of producing a large volume of food;

(h) to provide an apparatus for dispensing funnel cake batter or other batter that is not subject to having to be frequently welded or repaired in order to maintain production;

(i) to provide an apparatus for dispensing funnel cake batter or other batter that is not easily dented becoming inoperable.

(j) to provide an apparatus for dispensing funnel cake batter or other batter that does not require a special stand to hold the apparatus in an upright position to avoid spillage;

(k) to provide an apparatus for dispensing funnel cake batter or other batter that does not require refilling after every discharge of batter, (l) to provide an apparatus for dispensing funnel cake batter or other batter that does not require the physical exertion of constant and repetitive manual pressing of a knob by the thumb of the user in order to dispense the batter.

Further objects and advantages are to provide an apparatus for dispensing funnel cake batter or other batter which can be used easily and conveniently. Still further objects and advantages will become apparent from a consideration of the ensuing description and drawings.

DRAWING FIGURES

The drawings show the apparatus comprising an assembly made-up of three subassemblies, namely subassembly A, subassembly B, and subassembly C.

Reference Numerals In Drawings

10 CO 2 tank (liquified carbon dioxde tank)
12 Compressed Gas Regulator 366m (Tap Rite Seres 740)
14 (2) ¼" 90 degree Stainless steel Street elbows
16 (3) ¼"×2" Stainless steel nipples
18 ¼" Stainless steel FIP Ball Valve
18A ¼" Stainless steel FIP Ball Valve
19 ¼" Stainless steel Union Tee
20 ¼" plastic pie to ¼" metal pipe Stainless steel Male Adaptor
21 ¼" (0.265×0.475) Beverage Flex N.S.F. Hose
22 (4) Stainless steel Clamps
23 ¼" Liquid or Gas Pepsi Style Disconnect
24 North American Sankey Beverage Container Lid
25 Threaded Hole in North American Sankey Beverage Container Lid
26 Pop Safety valve with spring and plunger rod for Sankey Beverage Container Lid
27 Rubber sealing ring for North American Sankey Beverage Container Lid
28 3 or 5 gallon Stainless Steel North American Sankey Beverage Container
29 Hole
30 ½"×6" Stainless steel nipple
32 ½" Stainless steel FIP Ball Valve
32A ½" Stainless steel FIP Ball Valve
34 Female half of a ½" Stainless steel Union
34A Male half of a ½" Stainless steel Union
36 (2) ½" plastic pipe to ½" metal pipe Stainless steel Male Adaptor
38 ½" Clear Plastic tubing
40 ½" Stainless steel Male Coupling
42 ½" Stainless steel tube with 45 degree bend approximately 4.5 inches from one end

Figure 1:
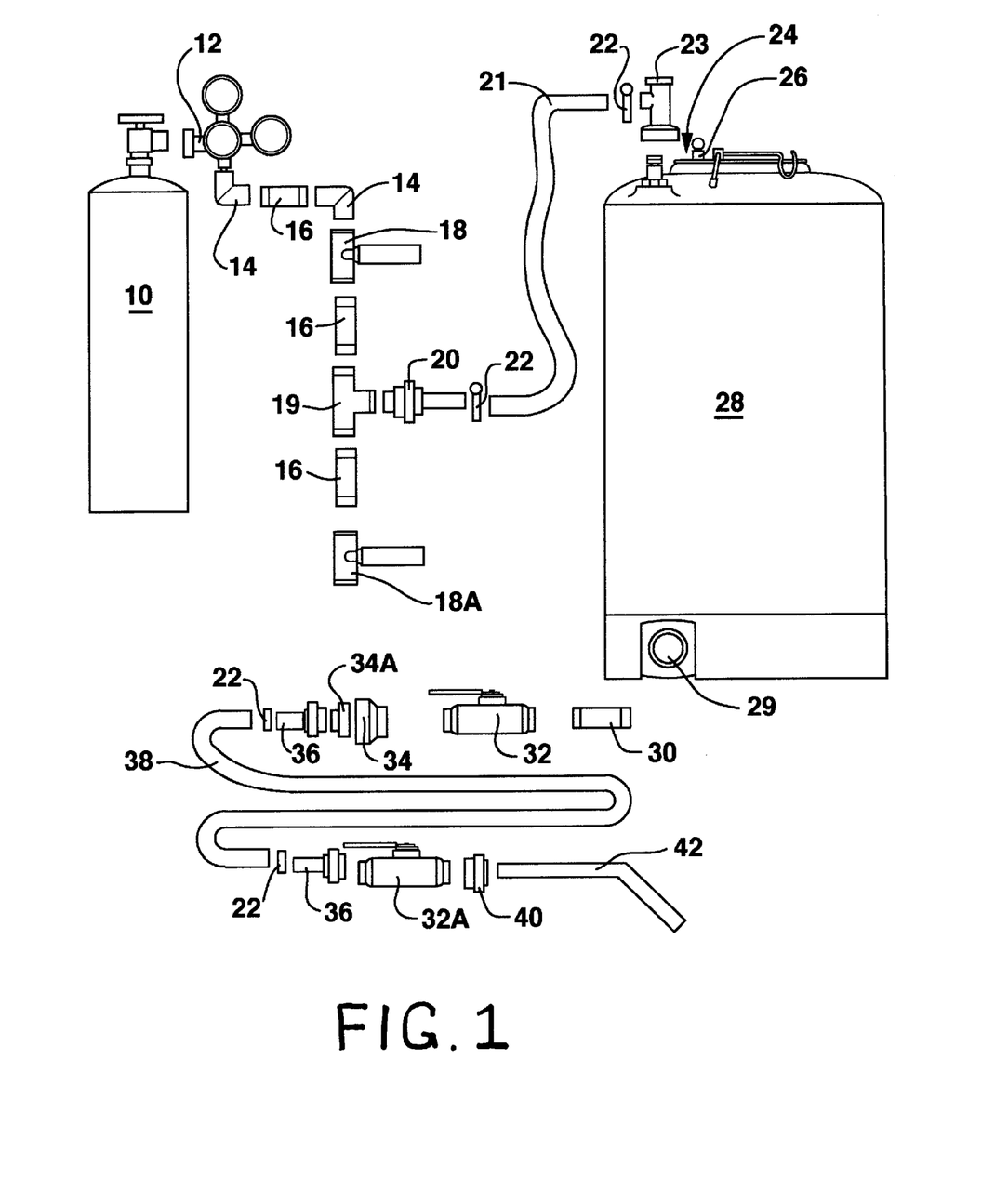
FIG. 1 shows all three subassemblies for the apparatus.

DETAILED DESCRIPTION-FIG. 1

The present invention shown in FIG. 1 illustrates the three subassemblies, namely subassembly A, subassembly B, and subassembly C, which comprises the apparatus for dispensing funnel cake and other batter.

A, commonly known, standard liquified carbon dioxide tank 10, which is normally used in the dispensing of pre or post mix soft drinks, is interconnected to a, commonly known, Tap Rite Series 740 Compressed Gas Regulator 366m 12. Tap Rite Series 740 Compressed Gas Regulator 366m 12, U.S. Pat. No. 2,981,280, is joined to the control valve of carbon dioxide tank 10, at one end, and at the other end is joined to a ¼" 90 degree stainless steel street elbow 14. Street elbow 14 is interconnected to a ¼"×2" stainless steel nipple 16 which is joined to a second ¼" 90 degree stainless steel Street elbow 14. A second Street elbow 14 is interconnected to a ¼" stainless steel FIP Ball valve 18. FIP Ball valve 18 is interconnected to a second ¼"×2" stainless steel nipple 16 which is joined to a ¼" stainless steel Union Tee 19. The opposite end of the ¼" stainless steel Union Tee 19 is interconnected to a third ¼"×2" stainless steel nipple 16 which is joined to a second ¼" stainless steel FIP Ball valve 18A. The middle opening of Union Tee 19 is interconnected to a ¼" plastic pipe ¼" metal pipe stainless steel Male Adaptor 20. Male Adaptor 20 is interconnected to a ¼" (0.265×0.475) Beverage Flex N.S.F. Hose 21. Beverage Flex N.S.F. Hose 21 is held securely in place on the plastic pipe end of the Male Adaptor 20 by a stainless steel Clamp 22. The other end of Hose 21 is joined to a ¼" Liquid or Gas Pepsi Style Disconnect 23, and Hose 21 is held securely in place by a second stainless steel Clamp 22.

Disconnect 23 is connected to the inlet pressure valve of a, commonly known, 3 or 5 gallon stainless steel North American Sankey Beverage Container 28, U.S. Pat. No. 3,076,576. Beverage Container 28 is a refillable repository for funnel cake batter or other batter. The size of Container 28 used is dependent upon the commercial need of the user.

A 3 gallon Container 28 holds approximately 25 lbs. of funnel cake batter of other batter, and a 5 gallon Container 28 holds approximately 41 lbs. of batter. A ½"×6" stainless steel nipple 30 is joined, permanently, by a weld to a Hole 29 that is bored at the side near the bottom base of Beverage Container 28. The other end of nipple 30 is interconnected to a ½" stainless steel FIP Ball valve 32. FIP Ball valve 32 is interconnected to the female half of a stainless steel Union 34. North American Sankey Lid 24 is joined to Container 28.

The female half of Union 34 is joined to the male half of a Union 34A. Union 34A is interconnected to a ½" plastic pipe to ½" metal pipe Stainless steel Male Adaptor 36. A ½" Clear plastic tubing 38 joined to the plastic pipe end of Male Adaptor 36, and plastic tubing 38 is held securely in place by a third stainless steel Clamp 22. The other end of plastic tubing 38 is joined to a second ½" plastic pipe to ½" metal pipe Stainless steel Male Adaptor 36. And, that end of plastic tubing 38 is held securely in place by a fourth stainless steel Clamp 22. The metal pipe end of Male Adaptor 36 is interconnected to a second ½" stainless steel FIP Ball valve 32A. Ball valve 32A is interconnected to a ½" Stainless steel Male Coupling 40. Male Coupling 40 is joined, permanently, by a weld to a ½" Stainless steel tube 42. Stainless steel tube 42 is approximately ten inches in length, and tube 42 has a 45 degree bend approximately 4.5 inches from the end not joined to Coupling 40. Tube 42 is the pouring wand from which the funnel cake batter or other batter is discharged into a fryer or griddle.

It will be readily apparent to those of ordinary skill in the art that many components of subassembly A, subassembly B, and subassembly C could be used made out of any strong rust-resistant material, such as high density plastic, or other metal alloys may be suitably used.

Figure 2:
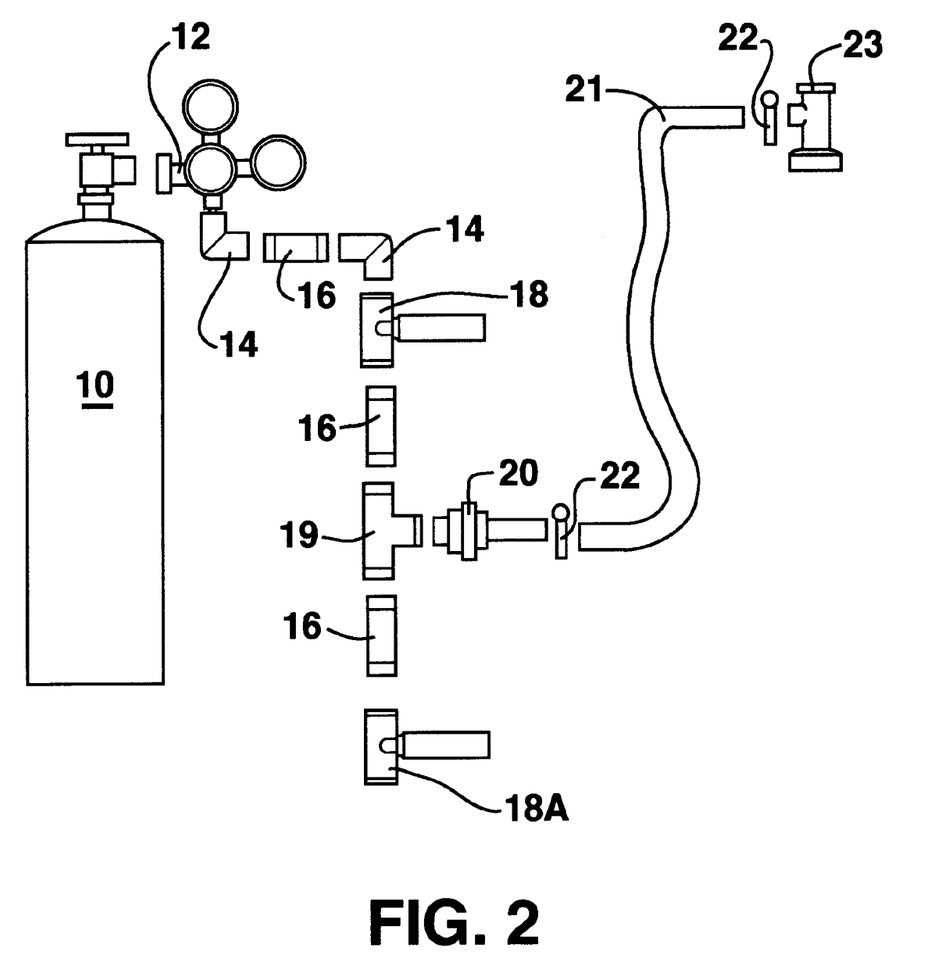
FIG. 2 shows subassembly A.

DESCRIPTION-FIG. 2

FIG. 2 illustrates the components of subassembly A:

A carbon dioxide tank 10, a Compressed Gas Regulator 12, Two Street Elbows 14, Three Nipples 16, Two FIP Ball Valves 18 and 18A, a Union Tee 19, a Adaptor 20, a Hose 21, Two Clamps 22, and a Disconnect 23. The following components of subassembly A normally remain joined, connected, or interconnected: Regulator 12, Two Street Elbows 14, Three Nipples 16, Two FIP Ball Valves 18 and 18A, a Union Tee 19, a Adaptor 20, a Hose 21, Two Clamps 22, and a Disconnect 23. Carbon dioxide tank 10 is the only component of subassembly A that is normally disconnected from subassembly A, and that is when it is empty and needs to be refilled with liquified carbon dioxide.

Figure 3:
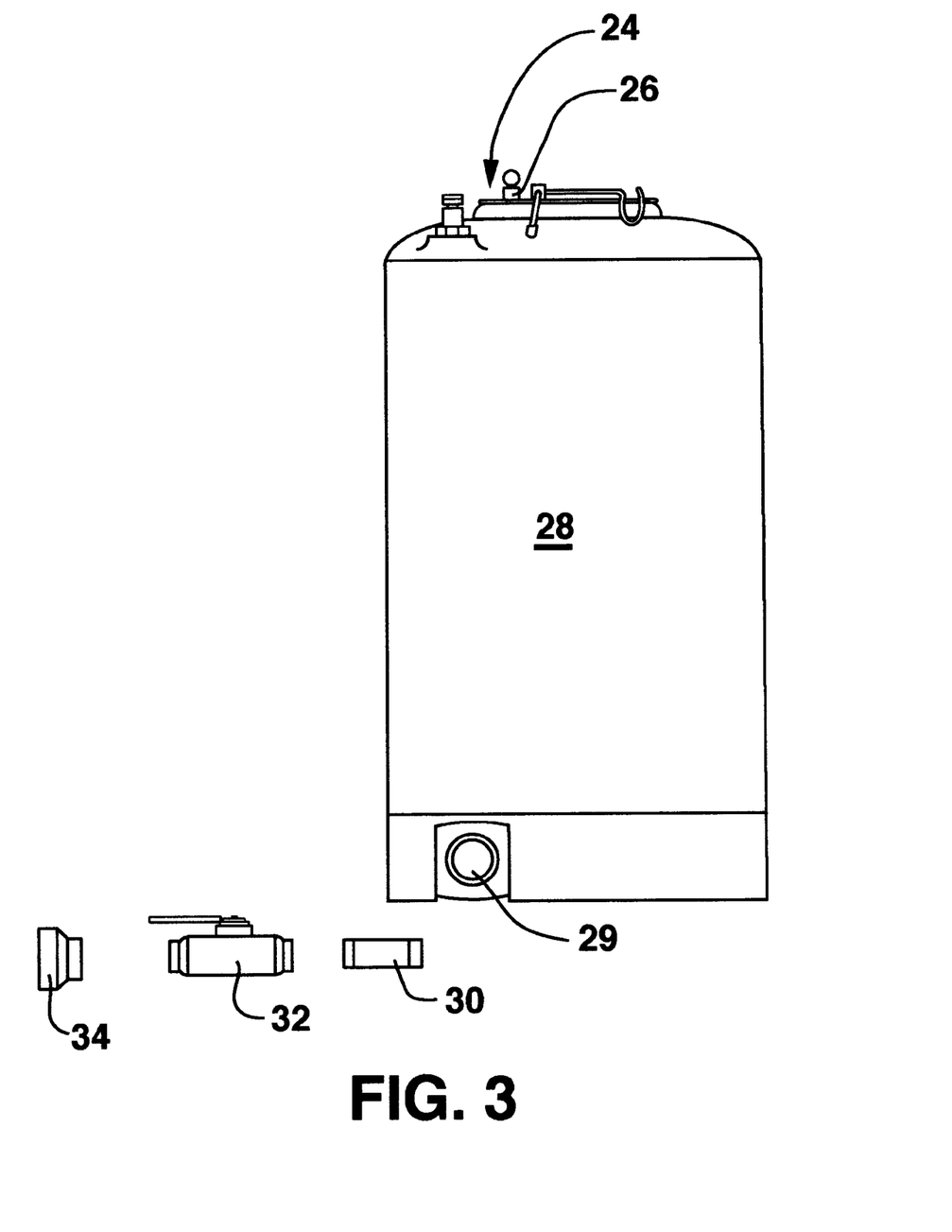
FIG. 3 shows subassembly B.

DESCRIPTION-FIG. 3

FIG. 3 illustrates the components of subassembly B:

A Beverage Container Lid 24, a Container 28, a Hole 29, a Nipple 30, a FHP Ball Valve 32, the female half of Union 34. The following components of subassembly B normally remain joined, connected, or interconnected: a Container 28, a Nipple 30 to Hole 29, a FIP Ball Valve 32, and the female half of a Union 34. Lid 24 is the only component of subassembly B that is normally disconnected from subassembly B, and that is when Container 28 is being filled, refilled, or cleaned.

Figure 4:
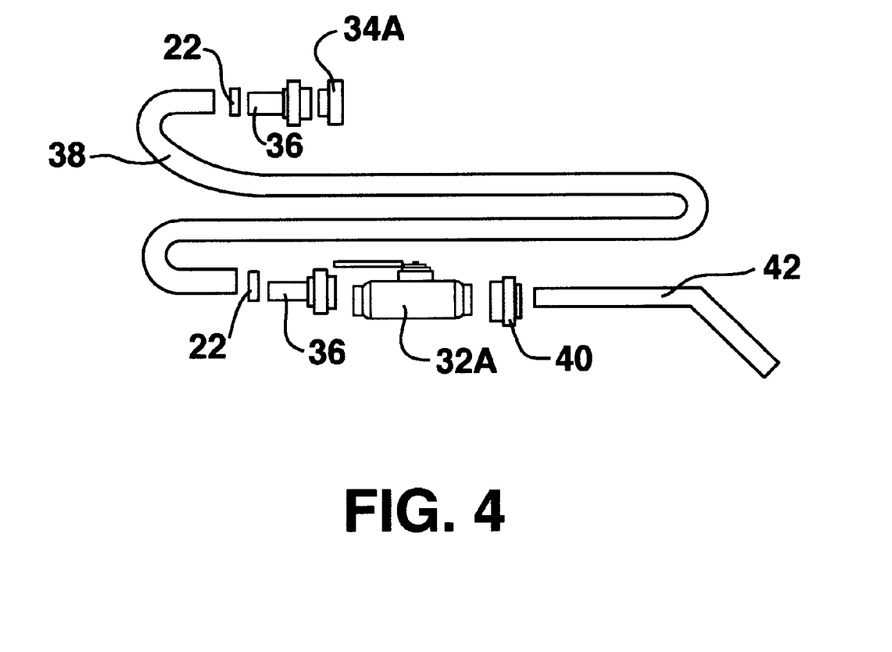
FIG. 4 shows subassembly C.

DESCRIPTION-FIG. 4

FIG. 4 illustrates the components of subassembly C:

The male half of a Union 34A, Two Adaptor 36, Two Clamps 22, a Clear Plastic Tubing 38, a FHP Ball Valve 32, a Coupling 40, a Stainless steel Tube 42. The following components of subassembly C normally remain joined, connected, or interconnected: Union 34A, Two Adaptors 36, Two Clamps 22, a Clear Plastic Tubing 38, a FIP Ball Valve 32A, a Coupling 40, and a Tube 42.

Figure 5:
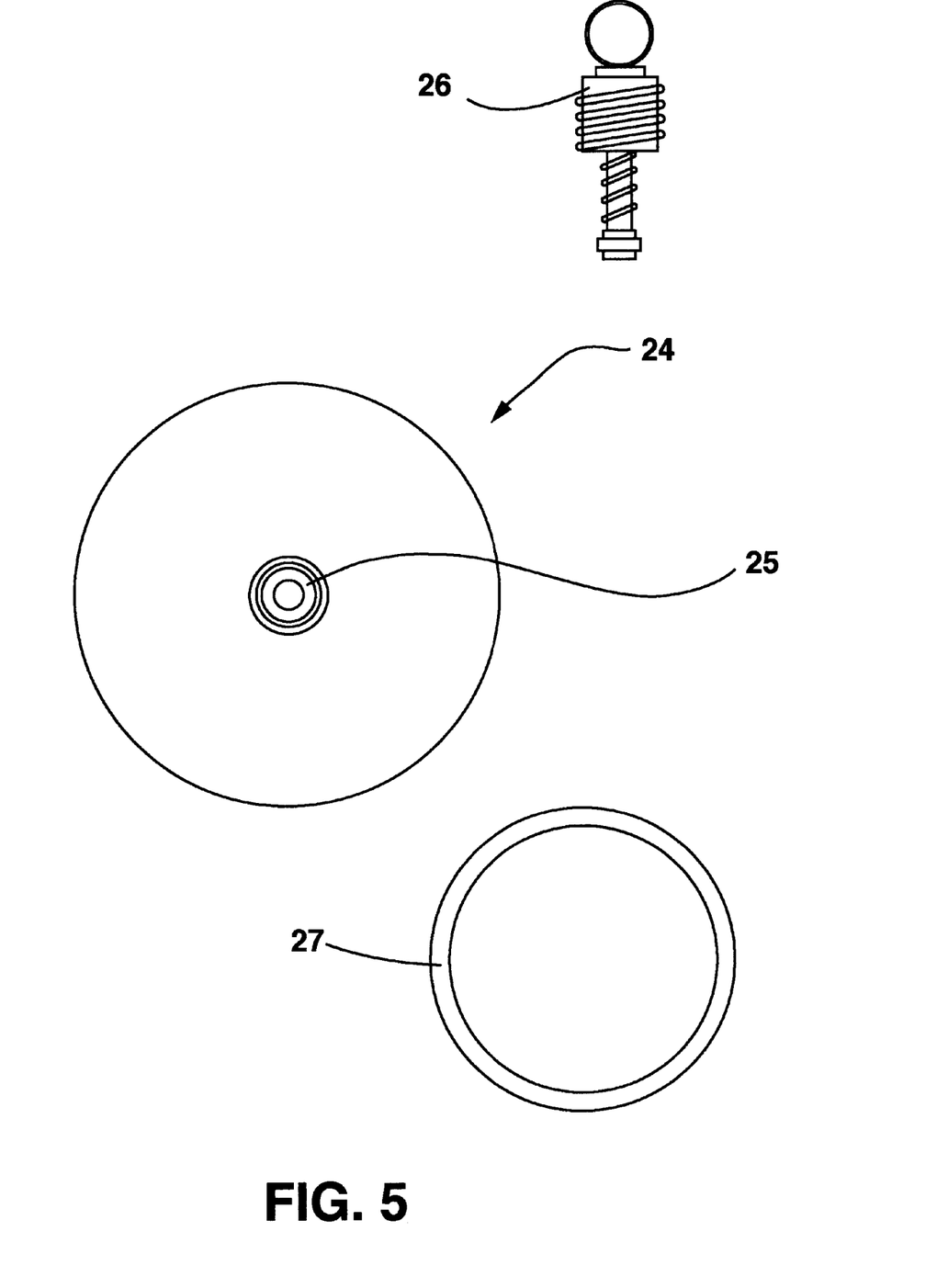
FIG. 5 shows lid, pop safety valve, and black rubber sealing ring.

DESCRIPTION-FIG. 5

FIG. 5 illustrates a Threaded Hole 25 which is in Lid 24. A Pop Safety Valve 26 with a spring on a plunger rod is interconnected to Hole 25. The spring used in the Funnel Cake or Other Batter Dispenser is not the same gauge spin that comes with Valve 26 from the factory where it is manufacture. Valve 26 comes, from the factory, with a spring that is of such a gauge that pressure from Container 28, when used as a beverage container, will be released if the pressure in Container 28 is greater than 130 lbs. p.s.i. In the present invention the original spring is replaced with a spring of such a gauge that Pop Safety Valve 26 will release pressure from Container 28 if the pressure is greater than a range of 35 to 40 lbs. p.s.i. This is a safety feature in order to prevent Tubing 38 from rupturing. A black rubber ring 27 is joined to the indented lip of Lid 24 to seal off the Container 28 when Lid 24 is closed and the apparatus is in use.

Figure 6:
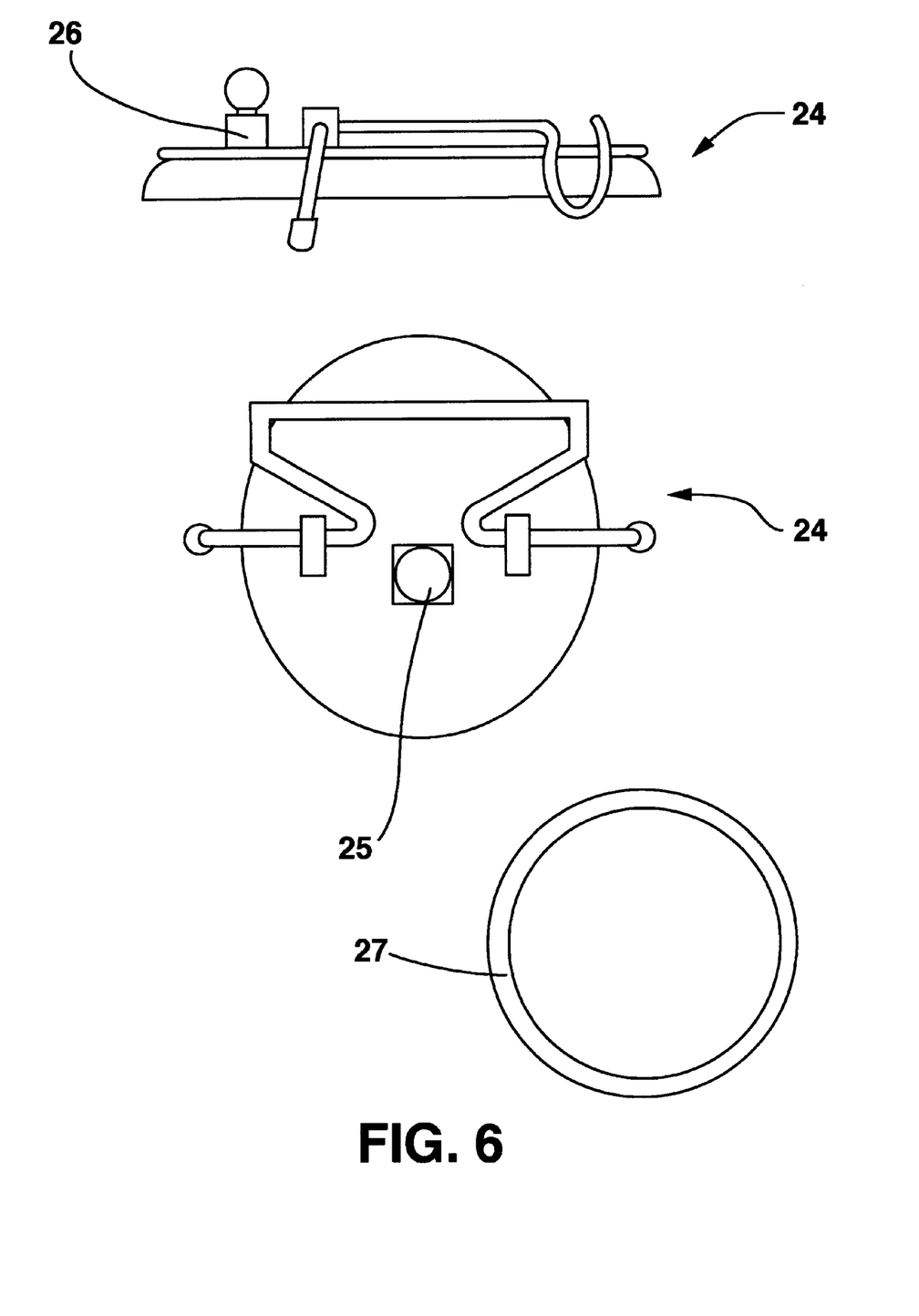
FIG. 6 shows another view of lid, pop safety valve, and black rubber sealing ring.

DESCRIPTION-FIG. 6

FIG. 6 is another view of. Lid 24, Pop Safety Valve 26, and Ring 27.

Advantages

From the description above, a number of advantages of the present invention become evident:

(a) It is an apparatus for dispensing funnel cake batter or other batter in a more productive manner in that tie user simply has to open the FIP ball valve on the pouring wand to dispense batter into the fryer or on die giddle in an even flowing manner.

(b) It is an apparatus for dispensing funnel cake batter or other batter in a more sanitary manner in that the user does not have to dip his, possibly dirty or unwashed, hand into a batter container to fill a funnel for dispensing the batter. And, the funnel cake batter or other batter is sealed off in the present invention's container from pests and airborne contaminates. The batter does not leak out causing an unsanitary food preparation area.

(c) It is an apparatus for dispensing funnel cake batter or other batter in a labor saving manner in that the user is not having to hold a heavy funnel or funnel cake pitcher in his hand to dispense the batter. The pouring wand of the present invention we less than two lbs. Since, the 3 gallon Container of the present invention holds approximately 25 lbs. of batter and the 5 gallon Container holds approximately 41 lbs. of batter the user of this invention can cook in a commercial environment for long periods of time without having to constantly refill his dispenser. And, the user of this present invention is not becoming fatigued from manually pressing a knob or lever with his thumb to dispense batter.

(d) It is an apparatus for dispensing funnel cake batter or other batter in a timesaving manner in that the user is not wasting time dipping or refilling in order to serve a large volume of food.

(e) It is an apparatus for dispensing funnel cake batter or other batter that is not subject to becoming inoperable from denting by accidentally dropping it, and the present invention is not structurally weak needing to be frequently re-welded.

(f) It is an apparatus for dispensing funnel cake batter or other batter that does not require a special stand to set the batter container or hopper in when not in use to avoid spillage.

(g) It is an apparatus for dispensing funnel cake batter or other batter that can produce large volumes of food.

(h) It is an apparatus for dispensing funnel cake batter or other batter that can be used to conveniently be used to store batter in for future use. Subassembly B accomplishes this.

Operation-FIGS. 1, 2, 3, 4

The manner of using the funnel cake batter or other batter dispenser is as follows:

The components of subassembly A, subassembly B, and subassembly C, shown in FIG. 1, are joined, connected, or interconnected as described in the Detailed Description of FIG. 1. The following valves are placed in the closed position: the valve on the carbon dioxide tank 10, FIP Ball Valves 18 and 18A, and both FIP Ball Valves 32. Compressed Gas Regulator 12 is set, by its adjusting screw, to regulate pressure, which is the carbon dioxide gas, between a range of 20 to 25 lbs. p.s.i. In normal operations Regulator 12, once it is adjusted and set to regulate pressure in a range of 20 to 25 lbs. p.s.i., does not have to be re-set each time the funnel cake batter or other batter dispenser is used.

Subassembly A is joined to subassembly B by the Disconnect 23 being connected to the inlet pressure valve of Container 28. Subassembly B is joined to subassembly C by the female half of Union 34 being joined to the male half of Union 34A.

Lid 24 is removed from Container 28. Container 28 is filled with the desired amount of funnel cake batter or other batter. Lid 24 is replaced and Container 28 is thereby sealed off. The valve on the carbon dioxide Tank 10 is opened. Opening the valve of Tank 10 allows the carbon dioxide gas to flow through Regulator 12 to FIP Ball Valve 18. Regulator 12 reduces the gas pressure from 800 lbs. p.s.i., which is the normal lbs. p.s.i. of a full liquified carbon dioxide tank, down to an operating range of 20 to 25 lbs. p.s.i which is the normal operating range of the funnel cake batter or other batter dispenser. Opening FIP Ball Valve 18 allows the carbon dioxide gas to flow in two directions: (1) to Container 28, and (2) to FIP Ball Valve 18A.

Next, FIP Ball Valve 32 is opened which allows the funnel cake batter or other batter to flow from Container 28, passed Ball Valve 32, through Plastic Tubing 38 to Ball Valve 32A. The user of the funnel cake batter or other batter dispenser then opens Ball Valve 32A to dispense the desired amount of batter into the fryer or onto the griddle. The user closes Ball Valve 32A to stop the flow of batter from Container 28. To dispense batter from the funnel cake batter or other batter dispenser, the user simply opens and closes Ball Valve 32A.

When, Container 28 is empty and needs to be refilled the user of the funnel cake batter dispenser closes valve 32A and valve 18. Closing valve 18 shuts off the flow of carbon dioxide from Tank 10. The user opens FIP Ball Valve 18A. Opening Ball Valve 18A discharges the carbon dioxide gas and releases the pressure from Container 28. Lid 24 is then removed from Container 28. Container 28 is refilled with batter. Once, the container is refilled then Lid 24 is replaced on Container 28 sealing it off for operation. Valve 18A is then placed in the closed position, and Valve 18 is opened. The funnel cake batter or other batter dispenser is ready for operation. The user, once again, only has to open and close Valve 32A to dispense batter.

If the user wishes to store, for future use, the batter in Container 28 he closes off valves 32A, 32, and 18. He opens valve 18A and releases the gas pressure from Container 28. Then the male half of Union 34A is disconnected from the female half of Union 34, and Container 28 or subassembly B can be stored in a walk-in freezer or in a refrigerator.

To clean the funnel cake batter or other batter dispenser shut-off the appropriate valves, as you would for refilling, and disconnect subassemblies, B, and C. And, follow any approved method of cleaning Commercial Food Industry dispensers. The subassembly B can be cleaned by soaking, scrubbing, and rinsing. The subassembly C can be cleaned by soaking, scrubbing, flushing the hose, and rinsing. Subassembly A can be cleaned by wiping off its components.

Operation-FIGS. 5, 6

The spring on the plunger rod of P op Safety Valve 26 is not the spring that comes from the factory where Container 28 and Lid 24 are manufactured. That spring is of a gauge that will cause Pop Safety Valve 26 to release the gas pressure from Container 28 if the pressure in Container 28 becomes greater than 130 lbs. p.s.i. That spring is replaced with a spring of such a gauge that will cause Pop Safety Valve 26 to release the gas pressure from Container 28 if the pressure in Container 28 becomes greater than a range of 35 to 40 lbs. p.s.i. This is a safety mechanism to protect plastic tubing 38, which is rated to withstand a maximum of 40 lbs. p.s.i, from rupturing.

Conclusions, Ramifications, and Scope

According, the reader will see the funnel cake batter or other batter dispenser permits for the dispensing of funnel cake batter or other batter in a more productive manner in that the user only has to open a valve to dispense batter; and It permits the dispensing of funnel cake batter or other batter a more sanitary manner in that the user does not have to dip his hand into a larger container to refill a funnel; and It permits the dispensing of funnel cake batter or other batter in a more sanitary manner in that the batter is closed off from pests or airborne contaminates; and It permits the dispensing of funnel cake batter or other batter in a more labor-saving manner in that the user does not have to dip into a large batter container to refill a funnel. Or, the user does not have to constantly refill a funnel cake pitcher. Or, the user does not have to manually have to press a knob or lever with his thumb to dispense the batter. Or, the user does not have to hold a heavy pitcher in his hand, for several hours as is the case in Commercial Food Industry, to dispense batter; and It permits the dispensing of funnel cake batter or other batter in a timesaving manner in that the user is not having to constantly refill, and batter is dispense at a faster rate from the pouring wand of the funnel cake batter or other batter dispenser than can be dispensed from a funnel, pitcher, or batter hopper, and It permits the dispensing of funnel cake batter or other batter in an evenly smooth flow from the pouring wand; and It permits the dispensing of funnel cake batter or other batter from an apparatus that is not easily rendered inoperable from damage due to accidental droppings and dents; and It permits the dispensing of funnel cake batter or other batter from an apparatus that does not require a special stand to hold it in when not in use to avoid spillage; and It permits the dispensing of funnel cake batter or other batter in large volumes; and It permits, by use of subassembly B, a container to store batter in for future use. Subassembly B can be disconnected from subassembly A and C and stored in a walk-in freezer or refrigerator. This also reduces waste and increases profits.

Thus, the scope of the funnel cake batter or other batter dispenser should be determined by the appended claims and their legal equivalents, rather than by the examples given.

I claim:

1. A funnel cake batter or other batter dispenser comprising:

a generally cylindrical vessel having top, bottom, and side wall defining an interior chamber and an access opening at one end thereof;

a releasably locked closure lid removably and sealingly mounted within said vessel opening for filling and refilling said vessel;

a pressure relief pop safety valve mounted on said closure lid with a sealed passageway in communication with said interior chamber as a means for relieving pressure in excess of 40 p.s.i. therein;

an inlet pressure valve means on said top wall with a passageway in communication with said interior chamber and adapted to be connected with gas pressurizing means to create a positive pressurization of a batter contained in said interior chamber;

a conduit means of sufficient size at a first end is joined to a hole in said side wall proximal to said bottom wall allowing communication with said interior chamber for permitting flow of said batter there-through, and a second end exterior to said side wall connected to a standard liquefied carbon dioxide tank is interconnected to a first end of a compressed gas regulator, and a second end of said compressed gas regulator is connected to a first end of a ball valve means for controlling flow of said pressure from said standard liquefied carbon dioxide tank;

a second end of said ball valve means is joined by means of a nipple of sufficient length to a first end of a union tee;

a flexible hose of sufficient length at a first end is adapted and connected to a second end of said union tee, and a second end of a flexible hose is adapted and releasably connected to said inlet pressure valve means on the top wall of said vessel;

a first end of a second ball valve is connected to a third end of said union tee by means of a nipple of sufficient length, and said second ball valve is a means of depressurizing said vessel.

2. The funnel cake batter or other batter dispenser according to claim 1 further comprising said selectively operable pouring wand for dispensing batter in a predetermined directional pattern-like manner.

3. The funnel cake or other batter dispenser according to claim 1 in which said selectively operable pouring wand is a subassembly comprising;

a first end of a ball valve adapted and connected to said second end of said flexible clear tubing, and a second end of said ball valve adapted and connected to a first end of a stainless steel tube of sufficient length and diameter;

said stainless steel tube has a forty-five degree bend approximately five inches proximal to a second end.

4. The funnel cake batter or other batter dispenser according to claim 1 in which said gas pressurizing means is a subassembly comprising;

a standard liquified carbon dioxide tank is interconnected to a first end of a compressed gas regulator, and a second end of said compressed gas regulator is connected to a first end of a ball valve means for controlling flow of said pressure from said standard liquified carbon dioxide tank to said vessel;

a second end of said ball means is joined by means of a nipple of sufficient length to a first end of a union tee;

a flexible hose of sufficient length at a first end is adapted and connected to a second end of said union tee, and a second end of a flexible hose is adapted and releasably connected to said inlet pressure valve means on top wall of said vessel;

a first end of a second ball valve is connected to a third end of said union tee by means of a nipple of sufficient length, and said second ball valve is a means of depressurizing said vessel.

* * * * *